(12) United States Patent
Fisher et al.

(10) Patent No.: US 8,435,121 B1
(45) Date of Patent: May 7, 2013

(54) PROVIDING REMOTE ACCESS TO GAMES DESIGNED FOR A SINGLE-MACHINE EXPERIENCE

(75) Inventors: Brian D. Fisher, Irvine, CA (US); Isaac J. Shepard, Ladera Ranch, CA (US)

(73) Assignee: Amazon Technologies, Inc., Reno, NV (US)

( * ) Notice: Subject to any disclaimer, the term of this patent is extended or adjusted under 35 U.S.C. 154(b) by 227 days.

(21) Appl. No.: 12/940,132

(22) Filed: Nov. 5, 2010

(51) Int. Cl.
*A63F 9/24* (2006.01)
*G06F 17/00* (2006.01)

(52) U.S. Cl.
USPC .................. 463/42; 463/25; 463/16; 463/31; 473/1

(58) Field of Classification Search .......................... None
See application file for complete search history.

(56) References Cited

U.S. PATENT DOCUMENTS

| | | | |
|---|---|---|---|
| 5,071,121 A * | 12/1991 | Garret | 473/1 |
| 2006/0068917 A1* | 3/2006 | Snoddy et al. | 463/42 |
| 2006/0105825 A1* | 5/2006 | Findlay | 463/4 |
| 2007/0259707 A1* | 11/2007 | Kang | 463/16 |
| 2007/0270206 A1* | 11/2007 | Snoddy et al. | 463/19 |
| 2009/0082102 A1* | 3/2009 | Sargaison et al. | 463/31 |

\* cited by examiner

*Primary Examiner* — Paul A D'Agostino
(74) *Attorney, Agent, or Firm* — Thomas Horstemeyer, LLP

(57) ABSTRACT

Disclosed are various embodiments for providing remote access to games that were designed for a single-machine experience. A game that has a single world state is executed in a virtualized environment in one or more computing devices. One or more input events are provided to the game based at least in part on input data from multiple clients that are controlling the game. A video signal generated by the game is encoded into a media stream, and at least a portion of the media stream is sent to each of the clients.

30 Claims, 7 Drawing Sheets

PROVIDING REMOTE ACCESS TO GAMES DESIGNED FOR A SINGLE-MACHINE EXPERIENCE

BACKGROUND

Some video games may allow multiple players to participate in the game play. Other video games are developed strictly for a single player. With some multiplayer games, the players are located at the same game-playing device and watch the action on a single display. In some cases, a split screen may be rendered on the display, and the action relative to each player may be shown in a respective region of the split screen. With other multiplayer games, each player is located at a distinct game-playing device, with the game play being synchronized over a network.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing remote access to games that were originally designed for a single-machine experience and lack Internet-based multiplayer capabilities. Many games were written to be played on a single computing device or video game device without networked multiplayer capabilities. Such games may be single-player games or multiple-player games. Various embodiments of the present disclosure are configured to execute such a game in a virtualized environment, while providing remote access to the game to multiple clients. Thus, various embodiments enable networked multiplayer capabilities to be easily added to a game that was originally a single-machine experience. In addition, a user may start a single-player game while at a first client in one location and later continue game play while at a second client in another location. In the following discussion, a general description of the system and its components is provided, followed by a discussion of the operation of the same.

Figure 1:
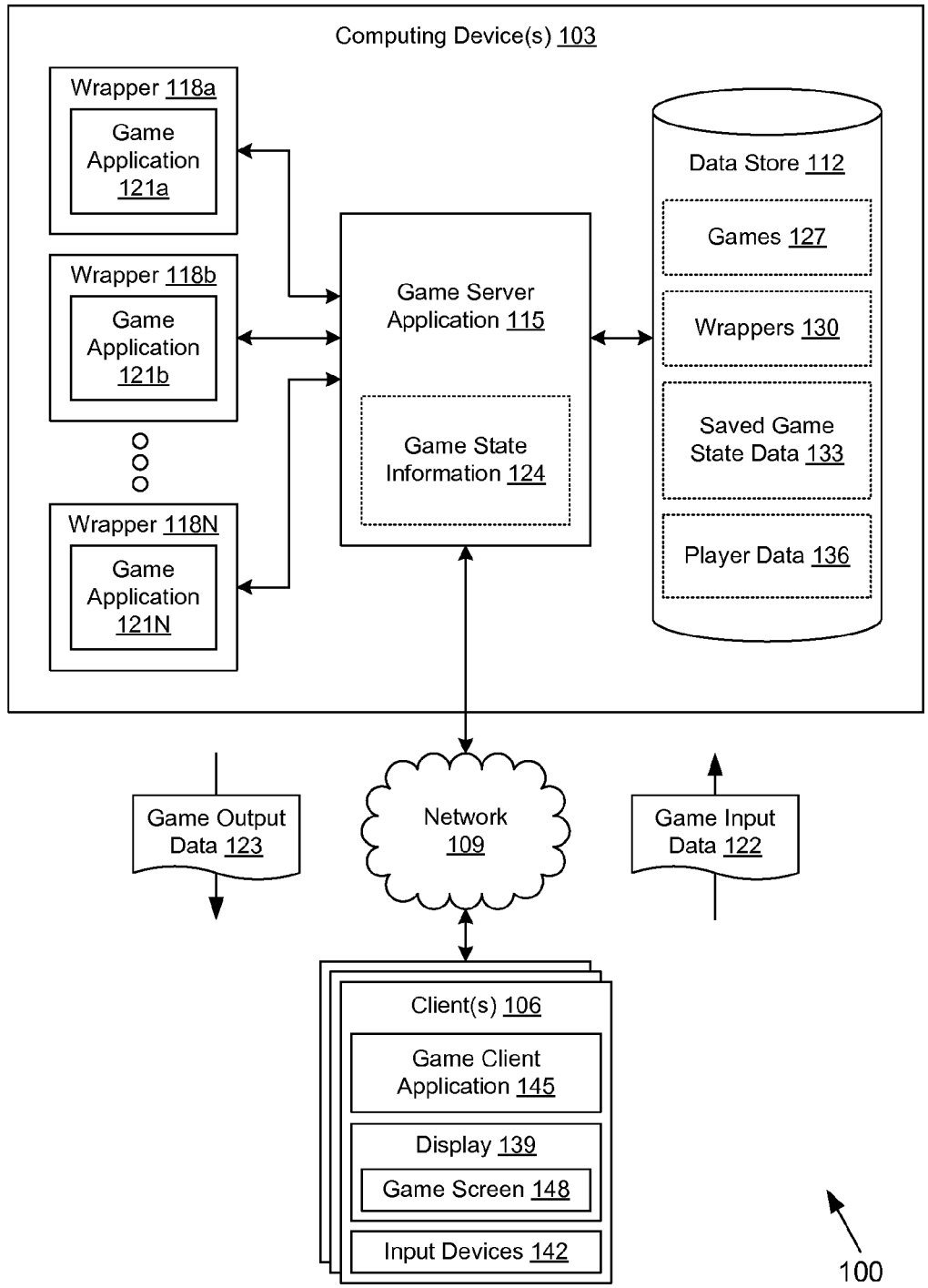
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a game server application 115, a plurality of wrappers 118a, 118b . . . 118N, a plurality of game applications 121a, 121b . . . 121N, and other applications, services, processes, systems, engines, or functionality not discussed in detail herein. The game server application 115 is executed to launch game applications 121, which are executed within the wrappers 118. The game server application 115 is also executed to obtain game input data 122 from the clients 106 and provide the game input data 122 to the respective wrapper 118.

The game server application 115 is also executed to send game output data 123 that is captured from the game application 121 to the clients 106. The game server application 115 may communicate with the client 106 over various protocols such as, for example, hypertext transfer protocol (HTTP), simple object access protocol (SOAP), real-time transport protocol (RTP), real time streaming protocol (RTSP), real time messaging protocol (RTMP), user datagram protocol (UDP), transmission control protocol (TCP), and/or other protocols for communicating data over the network 109. The game server application 115 is configured to maintain game state information 124 associated with the executing game applications 121.

The game application 121 may correspond to any game originally implemented for a single-machine experience. The game application 121 may be a single-player game, a multiple-player game, or include both single player and multiple player modes. As non-limiting examples, the game application 121 may correspond to a first-person shooter game, an action game, an adventure game, a party game, a role-playing game, a simulation game, a strategy game, a vehicle simulation game, and/or other types of games. The game application 121 may be a game originally designed for execution in a general-purpose computing device or in a specialized video game device such as, for example, a video game console, a handheld game device, an arcade game device, etc. The game application 121 may expect to access one or more resources of the device on which it is executed. Such resources may correspond to display devices, input devices, or other devices. In some cases, the game application 121 may request exclusive access to one or more of the resources, whereby no other applications may have access to the particular resources.

The wrapper 118 corresponds to an application that provides a virtualized environment for execution of the game application 121. In particular, the wrapper 118 may be configured to virtualize one or more of the resources that the game application 121 expects to access. Such resources may include a keyboard, a mouse, a joystick, a video device, a sound device, etc. In this way, the wrapper 118 is able to provide input commands to game application 121 as if the wrapper 118 emulates a keyboard, a mouse, or another type of input device.

Further, the wrapper 118 is able to obtain a video signal generated by the game application 121 as if the wrapper 118 emulates a display device, an audio device, or another type of output device. The wrapper 118 is able to encode the video signal into a media stream. The media stream may include an audio signal generated by the game application 121 as well. To this end, the wrapper 118 may include various types of video and audio encoders, such as, for example, Moving Pictures Experts Group (MPEG) encoders, H.264 encoders, Flash® video encoders, etc. Such encoders may be selected according to factors such as, for example, data reduction, encoding quality, latency, etc. In some embodiments, the wrappers 118 may communicate directly with the clients 106 to obtain the game input data 122 and to serve up the game output data 123.

Different types of wrappers 118 may be provided for different game applications 121 or classes of game applications 121. As non-limiting examples, different wrappers 118 may be provided for game applications 121 using different application programming interfaces (APIs) such as OpenGL®, DirectX®, the Graphics Device Interface (GDI), and so on. Where the game application 121 is configured for execution in a specialized video game device or another type of computing device, the wrapper 118 may include an emulation application that emulates the device.

The game state information 124 that is maintained by the game server application 115 includes various data relating to game sessions that are currently active. For example, the game state information 124 may track the users that are currently participating in the game session, the players in the game session to which the users are mapped, scores and status information associated with the users, security permissions associated with the game session (e.g., who can or cannot join), and so on. In some embodiments, some or all of the game state information 124 may be discarded when a game session ends.

The data stored in the data store 112 includes, for example, games 127, wrappers 130, saved game state data 133, player data 136, and potentially other data. The games 127 correspond to a library of video games that are available to be launched as game applications 121. The games 127 may correspond to executable code within the computing device 103. Alternatively, the games 127 may correspond to code that is executable within another type of device but is not executable within the computing device 103. Such games 127 may be referred to as "binaries," read-only memory images (ROMs), and other terms. A particular game 127 may be executed as multiple instances of the game applications 121 for multiple game sessions. The wrappers 130 correspond to the executable code that implements the various types of wrappers 118. The wrappers 130 are executable in the computing device 103 and may be executed as multiple instances of the wrappers 118 for multiple game sessions.

The saved game state data 133 corresponds to game states that have been saved by the game applications 121. Because the game applications 121 are executed in a virtualized environment, the game applications 121 may write state information to a virtual location, which is then mapped for storage in the data store 112 as the saved game state data 133. The saved game state data 133 may correspond to data saved normally by the game application 121 or may correspond to a memory image of the game application 121 that may be resumed at any time. The player data 136 includes various data related to the users of the game applications 121, such as, for example, security credentials, game preferences, billing information, a listing of other users that are permitted to join games started by the user, and so on.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices 142 may incorporate haptic technologies in order to provide feedback to the user.

The client 106 may be configured to execute various applications such as a game client application 145 and/or other applications. The game client application 145 is executed to allow a user to launch, join, play, and otherwise interact with a game application 121 executed in the computing device 103. To this end, the game client application 145 is configured to capture input provided by the user through one or more of the input devices 142 and send this input over the network 109 to the computing device 103 as game input data 122.

The game client application 145 is also configured to obtain game output data 123 over the network 109 from the computing device 103 and render a game screen 148 on the display 139. To this end, the game client application 145 may include one or more video and audio players to play out a media stream generated by a game application 121. In one embodiment, the game client application 145 comprises a plug-in within a browser application. The client 106 may be configured to execute applications beyond the game client application 145 such as, for example, browser applications, email applications, instant message applications, and/or other applications.

Next, a general description of the operation of the various components of the networked environment 100 is provided. To begin, a user at a client 106 sends a request to launch a game application 121 to the game server application 115. The game application 121 does not include network multiplayer capabilities for play over the network 109 and was originally designed as a single-machine experience. The game server application 115 obtains the corresponding game 127 and wrapper 130 from the data store 112. The game server application 115 then launches the game application 121 in the corresponding wrapper 118. The game server application 115 tracks the status of the game within the game state information 124.

The wrapper 118 provides a virtualized environment for the game application 121 that virtualizes one or more resources of the computing device 103. Such resources may include exclusive resources, i.e., resources for which the game application 121 requests exclusive access. For example, the game application 121 may request full screen access from a video device, which is an exclusive resource because normally only one application can have full screen access. Furthermore, the wrapper may virtualize input devices such as, for example, keyboards, mice, etc. which may not actually be present in the computing device 103. In various embodiments, the wrapper 118 may correspond to a virtual machine and/or the wrapper 118 may be executed within a virtual machine.

The user at the client 106 enters input commands for the game by use of the input devices 142 of the client 106. As a non-limiting example, the user may depress a left mouse button. Accordingly, the game client application 145 functions to encode the input command into a format that may be transmitted over the network 109 within the game input data 122. The game server application 115 receives the input command and passes it to the wrapper 118. The wrapper 118 then provides a left mouse button depression to the game application 121 by way of a virtualized mouse. In some embodiments, different input commands may be presented to the game application 121 from those that were generated by a client 106. As a non-limiting example, if a user sends a mouse down command and the game client application 145 loses focus, the wrapper 118 may be configured to send a mouse down command followed by a mouse up command. In various embodiments, the input commands may be relayed to the wrapper 118 as soon as possible, or the input commands may be queued by the wrapper 118 and relayed to the game application 121 sequentially from the queue according to another approach.

Meanwhile, the graphical output of the game application 121 is captured by the wrapper 118 and encoded into a media stream. Additionally, the audio output of the game application 121 may be captured and multiplexed into the media stream. The media stream is transmitted by the game server application 115 to the client 106 over the network 109 as the game output data 123. The game client application 145 obtains the game output data 123 and renders a game screen 148 on the display 139. Ultimately, the effect of the input command performed by the user on the world state of the game may be reflected in the game screen 148.

Subsequently, other users may join the game application 121 and participate like the first user. Where the game application 121 corresponds to a single-player game, multiple users may share the same control over the game play. Thus, a user may start a game at one client 106 and continue the game at another client 106. Co-operative play is also made possible, with users taking turns at controlling the game play and/or controlling designated functions. As a non-limiting example, in a first-person shooter game, one user at a first client 106 may control the weaponry, while another user at a second client 106 may control movement within the game environment. When multiple users send respective input commands to the game server application 115, the world state of the game application 121 may be updated and the media stream may reflect the effects of the input commands sent by the multiple users.

Furthermore, multiple users at diverse locations may participate in a multiple-player game that was originally implemented for single-device play. As a non-limiting example, a game application 121 may have been developed to be executed in one device with multiple game controllers. Accordingly, the wrapper 118 may be configured to map input commands from one client 106 to a first virtual game controller and input commands from another client 106 to a second virtual game controller. As another non-limiting example, a game application 121 may have been developed to be executed in one device, where one side of the keyboard controls the first player and the other side of the keyboard controls the second player. Accordingly, the wrapper 118 may be configured to map input commands from one client 106 to keys on one side of a virtual keyboard and input commands from another client 106 to keys on another side of the virtual keyboard.

Various embodiments enable input generated through one type of input device 142 in a client 106 to be transformed by the wrapper 118 into input commands provided to the game application 121 through an entirely different type of virtual input device. As a non-limiting example, input generated by an accelerometer in the client 106 may be translated by the wrapper 118 into input provided through a virtual mouse. Thus, completely different kinds of input devices 142 may be used in playing the game that may not have been contemplated when the game application 121 was implemented.

Where input devices 142 incorporate haptic technologies and devices, force feedback may be provided to the input devices 142 within the game output data 123. As non-limiting example, a simulated automobile steering wheel may be programmed by force feedback to give the user a feel of the road. As a user makes a turn or accelerates, the steering wheel may resist the turn or slip out of control. As another non-limiting example, the temperature of the input device 142 may be configured to change according to force feedback. In one embodiment, force feedback generated from the game input data 122 of one client 106 may be included in the game output data 123 sent to another client 106.

Because the client 106 is decoupled from the hardware requirements of the game application 121, the game may be played on a diverse variety of clients 106 that are capable of streaming video with acceptable bandwidth and latency over a network 109. For example, the game may be played on a client 106 that is a smartphone. Thus, the client 106 need not include expensive graphics hardware to perform the complex three-dimensional rendering that may be necessary to execute the game application 121. By contrast, the hardware of the computing device 103 may be upgraded as needed to meet the hardware requirements of the latest and most computationally intensive game applications 121. In various embodiments, the video signal in the media stream sent by the game server application 115 may be scaled according to the bitrate and/or other characteristics of the connection between the computing device 103 and the client 106 over the network 109.

Because the multiplayer functionality is enabled through the use of the wrappers 118, development of the game application 121 is simplified. Implementing networked multiplayer functionality may be expensive from a game development perspective because multiple world states may be involved, such as one for each player. With the embodiments described herein, networked multiplayer functionality may be enabled for games with a single world state, which can greatly simplify game development by not requiring synchronizing of multiple world states over a network 109. In some cases, the game applications 121 may be written with an application programming interface (API) to simplify the development of wrappers 118.

With multiple users, the same video signal in the media stream may be sent to each client 106, or a distinct portion of the video signal in the media stream may be sent to each respective client 106. The latter may be preferable in the case of split-screen game play. Additional features may be implemented in the game server application 115 to improve the user experience. For example, users may be able to send webcam streams of themselves to the other users through the game server application 115. Also, users may be able to communicate with each other by text and/or voice, with the communication being facilitated through the game server application 115. An identification of the other users participating in a game may be sent to each of the users. When users leave a game, the game application 121 may continue to execute or the game application 121 may be terminated. The game state may be saved in the saved game state data 133.

Figure 2:
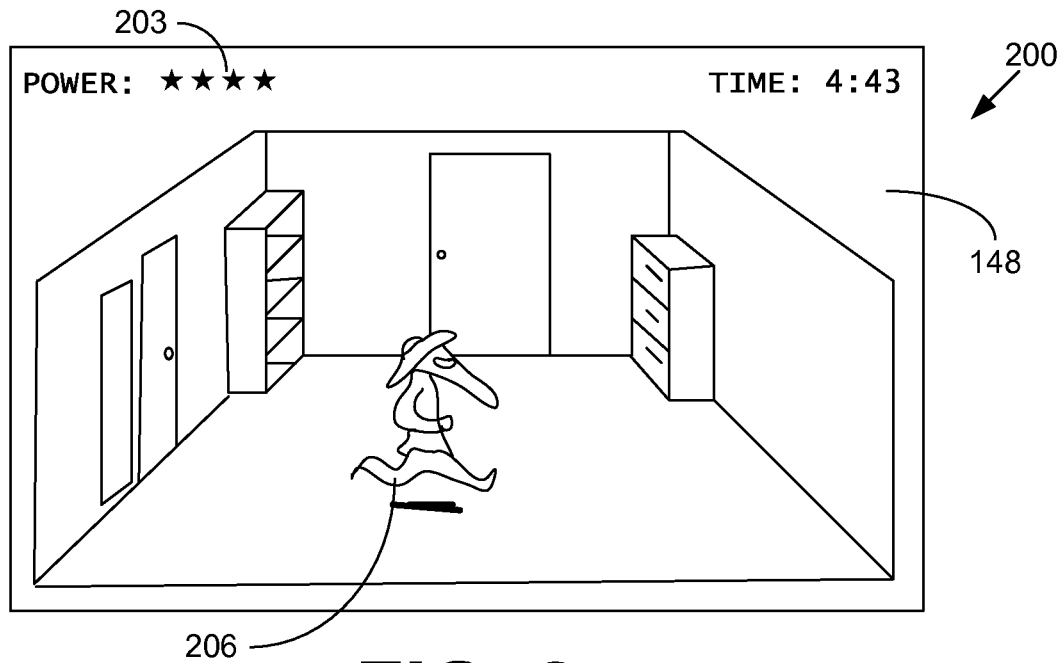
FIGS. 2-6 are drawings of examples of user interfaces rendered by a game client application in the networked environment of FIG. 1 according to various embodiments of the present disclosure.

Referring next to FIG. 2, shown is an example of a user interface 200 that is rendered by a game client application 145 (FIG. 1) in the client 106 (FIG. 1) in the networked environment 100 (FIG. 1). Specifically, FIG. 2 depicts one example of a game screen 148 that is generated by a game application 121 (FIG. 1), captured and encoded into a media stream, sent over the network 109 (FIG. 1), and played back by the game client application 145. In the example of FIG. 2, the game application 121 is a single-player game, which could be a multiple-player game being played by a single player.

The game screen 148 includes a status indication 203, which informs the user of the current status of the game. The status indication 203 may include points earned, time remaining, player health, and/or other metrics generated by the game application 121. The game screen 148 may include a sprite 206 corresponding to a character or object in the environment of the game that is controlled by one or more users. In the case of a game application 121 with a first-person perspective, the sprite 206 may be absent.

As a non-limiting example, FIG. 2 may correspond to a commercially available game application 121 such as Teenage Mutant Ninja Turtles® (TMNT) which was originally released by Konami Corporation as a coin-operated arcade game. The game application 121 may be a port or other version of the arcade game for a computer system or a binary image that is executable within an emulator application such as, for example, Multiple Arcade Machine Emulator (MAME) or another emulator application. The sprite 206 may correspond to a character that a user at a client 106 has selected, which, in this example, is one of the four ninja turtles: "Leonardo," "Michelangelo," "Donatello," or "Raphael." A user may play the TMNT game remotely at a client 106 with a joystick as if the user were in front of an arcade version of the game.

The remote access afforded by the game offers numerous advantages. For example, suppose that a user is playing the TMNT game at a client 106 at a workplace. Suppose that the user has selected the "Donatello" character and is currently battling "Bebop," the boss of stage 2. The user may suspend the game application 121, drive home, and resume play against "Bebop" at a client 106 located at the home of the user. Alternatively, a child of the user who is currently at the home client 106 may join the TMNT and continue play as "Donatello" against "Bebop" while the user is driving home. When the parent user returns home, the parent user may resume play at the point to which the child has progressed in the TMNT game, e.g., stage 3 and a battle against "Baxter Stockman."

Figure 3:
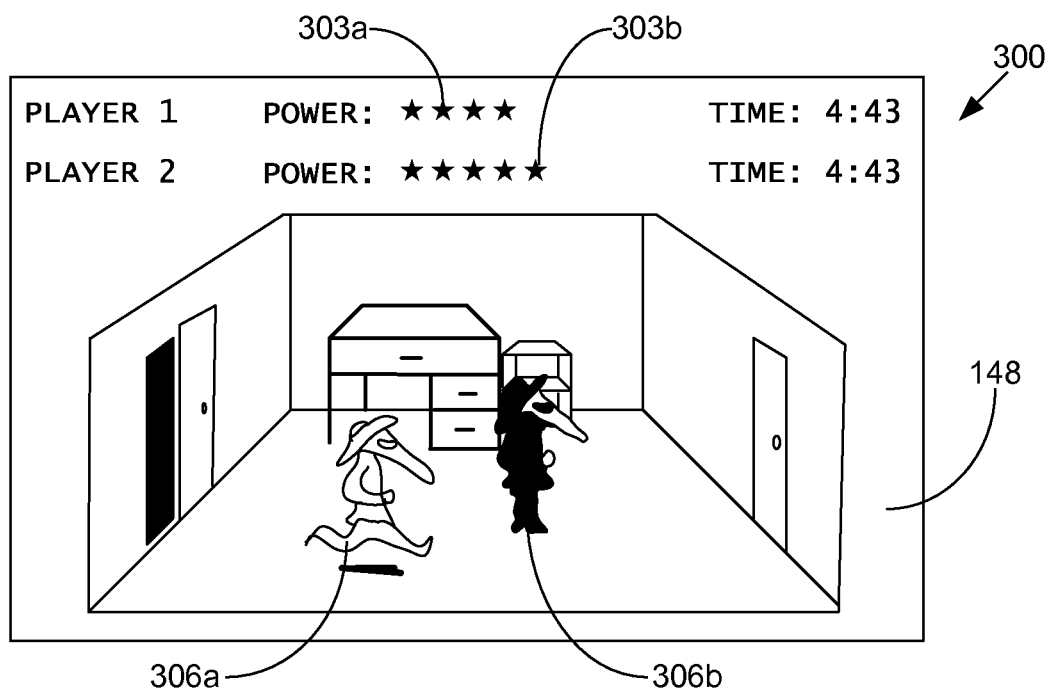

Turning now to FIG. 3, shown is another example of a user interface 300 that is rendered by a game client application 145 (FIG. 1) in the client 106 (FIG. 1) in the networked environment 100 (FIG. 1). Specifically, FIG. 3 depicts another example of a game screen 148 that is generated by a game application 121 (FIG. 1), captured and encoded into a media stream, sent over the network 109 (FIG. 1), and played back by the game client application 145. In the example of FIG. 3, the game application 121 is a multiple-player game with two players.

The game screen 148 includes status indications 303a and 303b for each of the players, which informs the users of the current status of the players in the game. The status indications 303 may include points earned, time remaining, player health, and/or other metrics generated by the game application 121. The game screen 148 includes sprites 306a and 306b that each correspond to a respective character or object in the environment of the game that is controlled by a player. In one example, each user at a respective client 106 controls a respective player. In another example, a player may be controlled by multiple users. Each of the users may be shown the same game screen 148.

Continuing with the TMNT example introduced in connection with FIG. 2, FIG. 3 may correspond to an instance of the TMNT game where two players are participating simultaneously. For example, a user at a first client 106 may have selected "Donatello" as the sprite 306a, while a user at a second client 106 may have selected "Raphael" as the sprite 306b. The two users may be at different geographic locations. In the game, the two users work together to defeat enemies such as "foot soldiers," "Bebop," "Rocksteady," "Baxter Stockman," "Lieutenant Granitor," "General Traag," "Krang," and "Shredder."

It is noted that the TMNT game was originally designed as a coin-operated arcade game, which is a single-machine experience. The arcade game did not include networked multiplayer functionality. However, the embodiments described herein allow the TMNT arcade game to be played in a networked environment 100 with multiple clients 106 controlling one, two, three, or four virtual joysticks of the game.

As another non-limiting example, FIG. 3 may correspond to "The Simpsons: The Arcade Game" from Konami Corporation. A first client 106 may be controlling the sprite 306a, which may correspond to the "Homer" character, while a second client 106 may be controlling the sprite 306b, which may correspond to the "Marge" character. In a minigame available in "The Simpsons: The Arcade Game," the characters may battle one another to be the first to finish a task. The minigame is based on repeated button-pushing, where the user who pushes the buttons fastest wins. When a user pushes a button or otherwise interacts with an input device 142 (FIG. 1), an input command that corresponds to a button push in the original arcade game may be sent to the game server application 115 (FIG. 1). The wrapper 118 (FIG. 1) may provide a virtual button device and translate the input commands to pushes on the virtual device. In one example, two users at different clients 106 may join to control the "Marge" character and co-operatively send button pushes to win the minigame.

As another non-limiting example, FIG. 3 may correspond to Gauntlet® by Atari Games Corporation. Gauntlet® is an arcade game that allows up to four players at a time at a single arcade machine. The players select among four playable characters: "Thor the Warrior," "Merlin the Wizard," "Thyra the Valkyrie," or "Questor the Elf." Each character may have different weapons, which lends well to co-operative play. By having multiple clients 106 control multiple sprites 306, multiple users may work together to advance in levels. As the game progresses, success may depend on the willingness of the players to co-operate by sharing resources and working together to slay enemies. Accordingly, the various embodiments described herein allow users who are geographically separated to co-operate in a game application 121 that was originally designed as a single-machine experience.

It is understood that the advantages of the present disclosure may also be realized in connection with game applications 121 having limited multiplayer functionality, such as, for example, Duke Nukem 3D by 3D Realms. Duke Nukem 3D included only limited multiplayer functionality using modem, serial cable, and internetwork packet exchange (IPX) local area networks. By executing Duke Nukem 3D as a game application 121 in the networked environment, Duke Nukem 3D may be controlled by multiple clients 106 across a network 109 (FIG. 1) such as, for example, the Internet.

Figure 4:
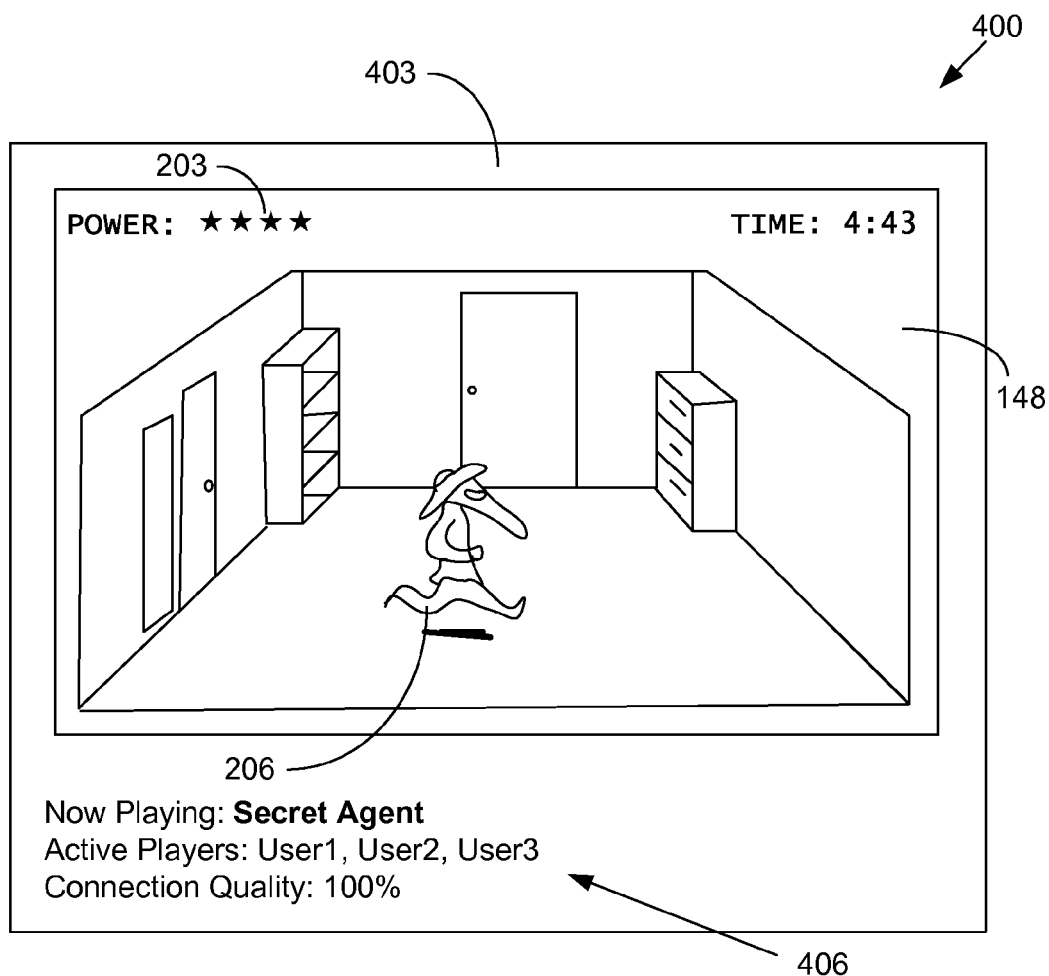

Moving on to FIG. 4, shown is another example of a user interface 400 that is rendered by a game client application 145 (FIG. 1) in the client 106 (FIG. 1) in the networked environment 100 (FIG. 1). In this example, the game screen 148 of FIG. 2 that is generated by the game application 121 (FIG. 1) is shown within a region of a larger display area 403. In addition, session status information 406 is included within the display area 403.

The session status information 406 provides additional status information that is not natively provided by the game application 121 itself. For example, the session status information 406 may include the title of the game application 121 (e.g., "Secret Agent"), an identification of the users that are currently controlling the game (e.g., "User1, User2, User3"), a network 109 (FIG. 1) connection quality indicator, and so on. In some embodiments, the session status information 406 may be superimposed on the game screen 148 rather than included in a larger display area 403. It is noted that in the example of FIG. 4, multiple users at different clients 106 are controlling the sprite 206 of a single-player game that is configured for single-device play.

The display area 403 may also include various user interface components for controlling the game, exiting the game, communicating with other users, controlling the audio, etc. In one embodiment, the display area 403 includes a region for displaying a video component of a user-provided media stream from one or more of the other users. Such a user-provided media stream may comprise a webcam stream from the respective user and/or another type of media stream. Whether the display area 403 is shown instead of the game screen 148 being shown full screen on the display 139 (FIG. 1) may be configured by the user in some embodiments.

With the TMNT example discussed in connection with FIG. 2, the session status information 406 may indicate that a first user at a client 106 is controlling the "Donatello" character. If multiple clients 106 are participating in the game, the session status information 406 may list screen names or other identifiers of the users who are controlling the "Donatello" character.

Figure 5:
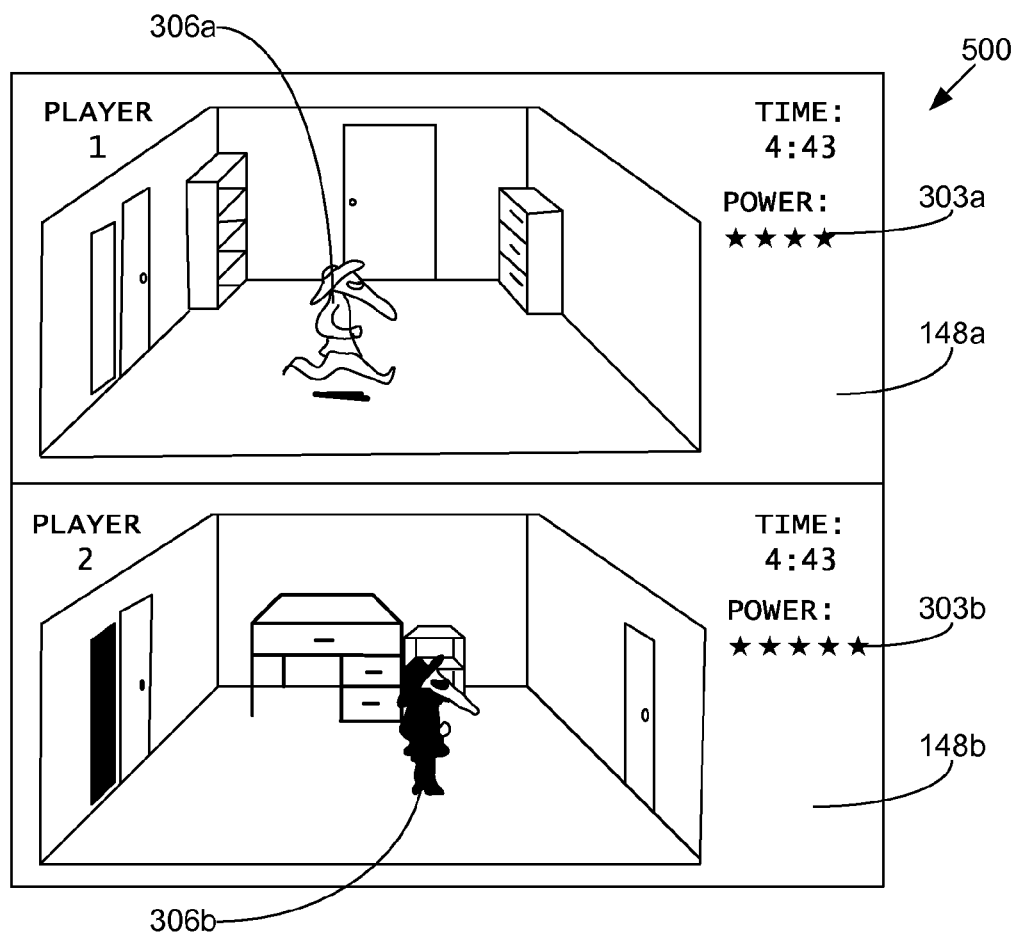

With reference to FIG. 5, shown is another example of a user interface 500 that is rendered by a game client application 145 (FIG. 1) in the client 106 (FIG. 1) in the networked environment 100 (FIG. 1). In the example of FIG. 5, as in the example of FIG. 3, the game application 121 (FIG. 1) is a multiple-player game with two players. However, unlike in FIG. 3, the game screen 148 comprises a split screen, with separate game screens 148a and 148b being shown on the display 139 (FIG. 1).

Each game screen 148 corresponds to the perspective of a particular player, each of which may be controlled by multiple users in some embodiments. In this example, the top game screen 148a corresponds to the perspective of "Player 1" and includes the status indication 303a and the sprite 306a corresponding to that player. The bottom game screen 148b corresponds to the perspective of "Player 2" and includes the status indication 303b and the sprite 306b corresponding to that player. Depending on the game play, the game screens 148 may show an identical environment with both sprites 306 in both game screens 148. In the example of FIG. 5, both game screens 148 are included within a single video signal captured from the game application 121 and sent to all of the clients 106 in a media stream.

As a non-limiting example, FIG. 5 may correspond to screen of "Mario Kart," developed by Nintendo Co., Ltd. In "Mario Kart," each player selects a character that races on a variety of tracks using go-karts. Players may compete against one another in various modes. Multiple game screens 148 may be included that each correspond to a player. For example, the top game screen 148a may correspond to a user at a first client 106 controlling a "Mario" character racing in a red go-kart, while the bottom game screen 148b may correspond to a user at a second client 106 controlling a "Luigi" character racing in a green go-kart. Both characters may be racing on the same track, but the perspective of each user may be different, hence the multiple game screens 148.

Figure 6:
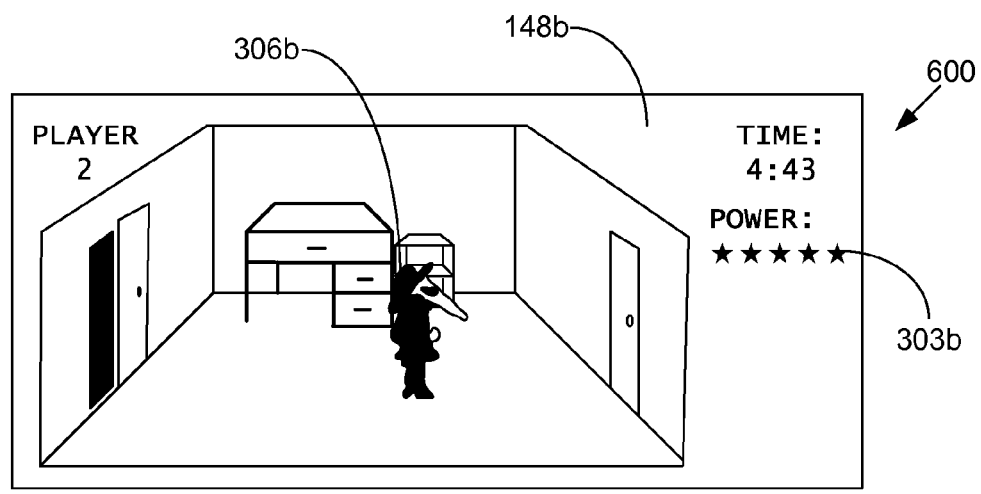

Turning now to FIG. 6, shown is yet another example of a user interface 600 that is rendered by a game client application 145 (FIG. 1) in the client 106 (FIG. 1) in the networked environment 100 (FIG. 1). FIG. 6 depicts the game screen 148b generated by the game application 121 (FIG. 1) in FIG. 5. However, in contrast to FIG. 5, the example of FIG. 6 includes only the game screen 148b and not the game screen 148a.

In this example, the game screen 148b corresponds to a portion of the video signal that is generated by the game application 121. The portion of the video signal is sent to the client(s) corresponding to "Player 2," while another portion of the video signal is sent to the client(s) 106 corresponding to "Player 1." In various embodiments, the portion of the video signal may be encoded as a distinct media stream. In one embodiment, the distinct media stream is encoded with higher resolution and/or quality than the portion of the media stream in, for example, FIG. 5. In another embodiment, the distinct media stream is encoded with a lower bitrate than the media stream would be otherwise to take advantage of the lower resolution of the smaller area of the game screen 148b versus a non-split screen.

Some game applications 121 may use a split screen some times, but not exclusively. In such cases, the wrapper 118 and/or the game server application 115 may be configured to switch back dynamically to full screen encoding of the video signal when the split screen is not used. Although the examples of FIGS. 5 and 6 relate to a game screen 148 that is split in half horizontally, it is understood that a game screen 148 may be divided into any number of portions and in any number of ways. In some examples, a game application 121 may employ a split screen with a number of views that do not correspond to particular players, e.g., a map view, a first-person view, etc. Such views may be transmitted together or separately in media streams to one or more of the clients 106 as desired.

Continuing with the "Mario Kart" example discussed in connection with FIG. 6, the game screen 148b may correspond to the user at the second client 106 who is controlling the "Luigi" character that is racing around the track using the green go-kart. Because the user may be focused on the game screen 148b during game play, it may be advantageous to present either higher quality video of just the game screen 148b or to reduce resource consumption by excluding the game screen 148a.

Figure 7:
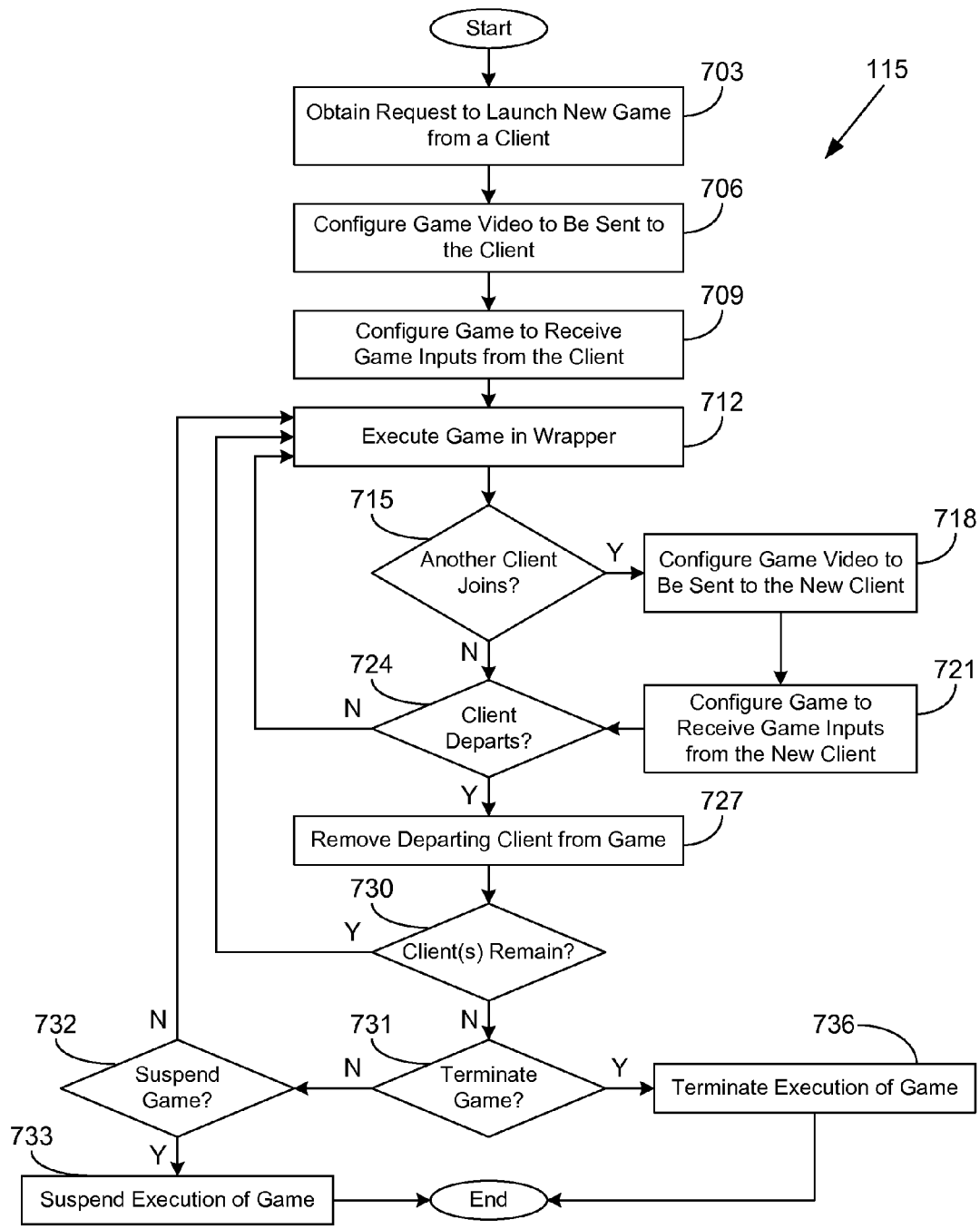
FIG. 7 is a flowchart illustrating one example of functionality implemented as portions of a game server application executed in a computing device in the networked environment of FIG. 1 according to various embodiments of the present disclosure.

Referring next to FIG. 7, shown is a flowchart that provides one example of the operation of a portion of the game server application 115 according to various embodiments. It is understood that the flowchart of FIG. 7 provides merely an example of the many different types of functional arrangements that may be employed to implement the operation of the portion of the game server application 115 as described herein. As an alternative, the flowchart of FIG. 7 may be viewed as depicting an example of steps of a method implemented in the computing device 103 (FIG. 1) according to one or more embodiments.

Beginning with box 703, the game server application 115 obtains a request to launch a new game application 121 (FIG. 1) from a client 106 (FIG. 1). The request may specify various configuration parameters, such as permissions for other users to join the game, a saved game state to be resumed, etc. In box 706, the game server application 115 configures the video from the game application 121 to be sent to the client 106 as game output data 123 (FIG. 1). In box 709, the game server application 115 configures the game application 121 to receive game inputs from the client 106 as game input data 122 (FIG. 1).

Next, in box 712, the game application 121 may be loaded from the games 127 (FIG. 1) and an appropriate wrapper 118 (FIG. 1) may be loaded from the wrappers 130 (FIG. 1), and the game application 121 may be executed in the wrapper 118. In box 715, the game server application 115 determines whether another client 106 has joined the game. For example, another client 106 may have authenticated with the system and may have permission to join the game.

If another client 106 has joined the game, the game server application 115 moves to box 718 and configures the game video to be sent to the new client 106 as game output data 123. In some cases, such as with a split screen, only a portion of the video signal captured from the game application 121 (e.g., a distinct region of the video) may be sent to the new client 106. In box 721, the game server application 115 configures the game application 121 to receive game inputs from the new client 106 as game input data 122. Depending on whether the game server application 115 is a multiple-player game, the game inputs of the new client 106 may be mapped to a particular player in the game. Accordingly, the game state information 124 (FIG. 1) may be updated.

The game server application 115 continues to box 724. If the game server application 115 determines in box 715 that another client 106 has not joined, the game server application 115 also continues to box 724. In box 724, the game server application 115 determines whether a client 106 has departed the game. If a client 106 has not departed, the game server application 115 continues execution of the game application 121 in the wrapper 118 in box 712. However, if a client 106 has departed the game, the game server application 115 proceeds to box 727.

In box 727, the game server application 115 removes the departing client 106 from the game. To this end, the game server application 115 may update the game state information 124 to remove the departing client 106 and may also notify other clients 106 that are participating in the game. In box 730, the game server application 115 determines whether one or more clients 106 remain in the game. If one or more clients 106 remain in the game, the game server application 115 returns to box 712 and continues execution of the game application 121 in the wrapper 118.

Otherwise, if no clients 106 remain in the game, the game server application 115 determines in box 731 whether the game application 121 is to be terminated. In some embodiments, the game server application 115 may be configured to terminate execution of the game application 121 when no clients 106 remain in the game. In other embodiments, the game server application 115 may be configured to allow the game application 121 to continue executing without any clients 106. In still other embodiments, the game server application 115 may be configured to save the state of the game application 121 in the saved game state data 133 (FIG. 1) so that execution of the game application 121 may be resumed at a later time.

If the game server application 115 determines that the execution of the game application 121 is not to be terminated, the game server application 115 moves to box 732 and determines whether the execution of the game is to be suspended. If the execution of the game is to be suspended, the game server application 115 continues to box 733 and suspends execution of the game application 121. The state of the game application 121 may, for example, be saved in the saved game state data 133. Thereafter, the portion of the game server application 115 ends.

If the game server application 115 determines that the game application 121 is not to be suspended, the game server application 115 returns to box 712 and continues execution of the game application 121 in the wrapper 118. If the game server application 115 determines in box 731 that the game application 121 is to be terminated, the game server application 115 terminates execution of the game application 121 in box 736. Thereafter, the portion of the game server application 115 ends.

Figure 8:
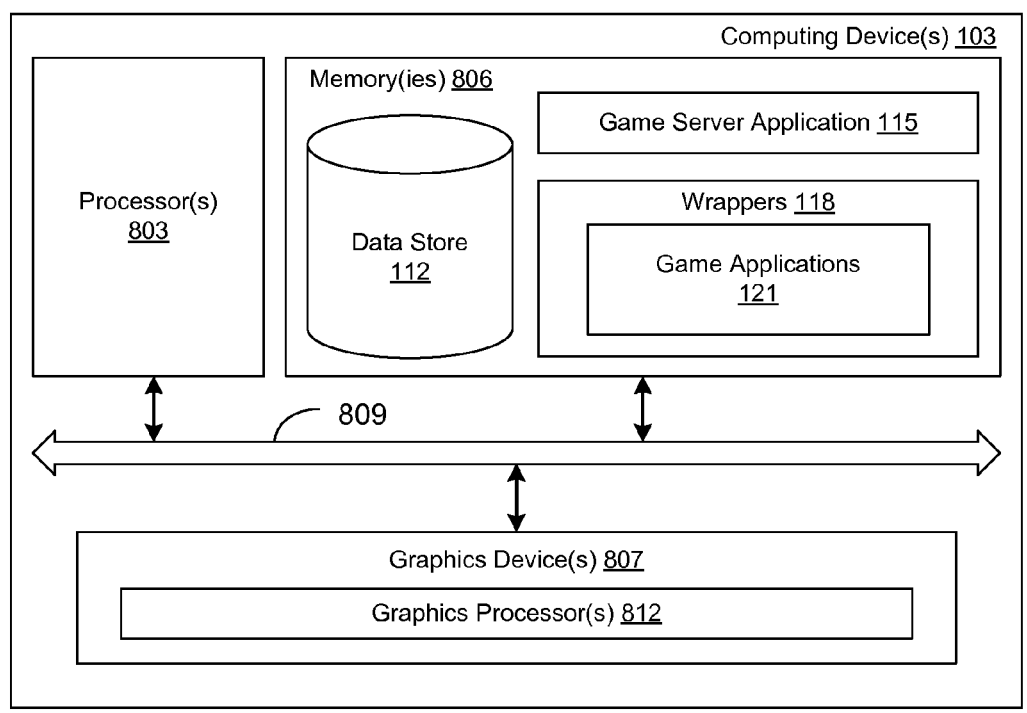
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 803, a memory 806, and one or more graphics devices 807, all of which are coupled to a local interface 809. To this end, the computing device 103 may comprise, for example, at least one server computer or like device. The local interface 809 may comprise, for example, a data bus with an accompanying address/control bus or other bus structure as can be appreciated. The graphics devices 807 may correspond to high-performance graphics hardware, including one or more graphics processors 812. The graphics devices 807 are configured to render graphics corresponding to the game applications 121 executed in the computing device 103.

Stored in the memory 806 are both data and several components that are executable by the processor 803. In particular, stored in the memory 806 and executable by the processor 803 are the game server application 115, the wrappers 118, the game applications 121, and potentially other applications. Also stored in the memory 806 may be a data store 112 and other data. In addition, an operating system may be stored in the memory 806 and executable by the processor 803.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the game server application 115, the wrappers 118, the game applications 121, the game client application 145 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 7 shows the functionality and operation of an implementation of portions of the game server application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the game server application 115, the wrappers 118, the game applications 121, and the game client application 145, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that obtains a request to launch a game from a first client, the game being selected by the first client from a library of games, the game being configured for single-device play with a single world state;

code that executes the game in a virtualized environment in one computing device of a cloud computing resource, the virtualized environment being configured to virtualize at least one exclusive resource of the one computing device;

code that provides a first input command to the game based at least in part on input data obtained from the first client;

code that provides a second input command to the game based at least in part on input data obtained from a second client;

code that obtains a video signal generated by the game, the video signal reflecting at least one change in the single world state effected by the first input command and the second input command;

code that divides the video signal into a first video signal and a second video signal, the first and second video signals corresponding to separate regions of the video signal;

code that encodes the first video signal into a first media stream and encodes the second video signal into a second media stream; and code that sends the first media stream to the first client and sends the second media stream to the second client.

2. The non-transitory computer-readable medium of claim 1, wherein the at least one exclusive resource comprises an input device.

3. The non-transitory computer-readable medium of claim 1, wherein the program further comprises:

code that obtains a first user media stream from the first client; and code that sends the first user media stream to the second client.

4. The non-transitory computer-readable medium of claim 1, wherein the program further comprises code that sends an identification of a user at the second client to the first client.

5. The non-transitory computer-readable medium of claim 1, wherein the program further comprises:

code that obtains an audio signal generated by the game; and code that encodes the audio signal into the media stream.

6. A system, comprising:

at least one computing device; and a game server application executable in the at least one computing device, the game server application comprising:

logic that executes a game in a virtualized environment in the at least one computing device, the game having a single world state;

logic that provides at least one input event to the game based at least in part on input data obtained from a plurality of clients that are controlling the game; and logic that obtains a video signal generated by the game, divides the video signal into a plurality of video signal portions, encodes each of the video signal portions into a respective one of a plurality of media streams, and sends a corresponding one of the media streams to each of the clients.

7. The system of claim 6, wherein the game server application further comprises logic that obtains a request from one of the clients to launch the game, wherein the game is selected by the one of the clients from a library of games.

8. The system of claim 6, wherein the game is not configured to synchronize multiple world states over a network.

9. The system of claim 6, wherein the game server application further comprises:

logic that obtains a request from another client to join the game;

logic that configures the logic that provides to obtain the input data from the another client and the clients; and logic that configures the logic that sends the media stream to send at least a portion of the media stream to the another client.

10. The system of claim 6, wherein the game server application further comprises:

logic that obtains a request from one of the clients to leave the game; and logic that configures the logic that provides not to obtain the input data from the one of the clients.

11. The system of claim 10, wherein the game server application further comprises logic that terminates execution of the game when no other client is controlling the game.

12. The system of claim 10, wherein the game server application further comprises logic that suspends execution of the game and saves the single world state of the game when no other client is controlling the game.

13. The system of claim 6, wherein the virtualized environment comprises an emulator application that emulates a video game device.

14. The system of claim 6, wherein the virtualized environment comprises a wrapper application that is configured to virtualize at least one resource in the at least one computing device.

15. The system of claim 14, wherein the game server application further comprises logic that selects the wrapper application from a plurality of wrapper applications based at least in part on the game.

16. The system of claim 6, wherein the game corresponds to a single-player game, and the game is controllable by any of the clients.

17. The system of claim 6, wherein the game corresponds to a non-networked, multiple-player game with a plurality of players.

18. The system of claim 17, wherein each player is configured to be controllable by a respective one of the clients.

19. The system of claim 17, wherein one of the players is configured to be controllable by a plurality of the clients.

20. The system of claim 17, wherein the video signal includes a plurality of display regions, each of the display regions corresponding to a respective one of the video signal portions, and each of the display regions is associated with a respective player.

21. The system of claim 20, wherein each of the media streams is sent to a respective at least one of the clients that is configured to control the respective player associated with the respective display region.

22. The system of claim 6, wherein the game server application further comprises:

logic that obtains a user media stream from one of the clients; and logic that distributes the user media stream to the clients other than the one of the clients.

23. A method, comprising the steps of:

sending, in a client computing device, a request to join a game that is executing in a game server, the game being configured for single-device play;

sending, in the client computing device, a first input command for controlling the game to the game server; and obtaining, in the client computing device, a media stream that encodes a portion of a video signal that is generated by the game, the portion corresponding to one of a plurality of display regions in the video signal, the media stream reflecting a shared world state of the game that is modified by the first input command and a second input command obtained by the game server from another client computing device.

24. The method of claim 23, wherein the game comprises a single-player game, and the game server is configured to facilitate control of the single-player game by a plurality of client computing devices.

25. The method of claim 23, wherein the game is configured to accommodate a plurality of players, the game server is configured to map the first input command to an input command of a first one of the players, and the game server is configured to map the second input command to an input command of a second one of the players.

26. The method of claim 23, wherein each of the display regions is associated with a respective player.

27. The method of claim 23, wherein the media stream includes one of a plurality of audio signals, and each of the audio signals is associated with a respective player.

28. The method of claim 23, further comprising the step of rendering, in the client computing device, the media stream for display, wherein an identification of a user associated with the another client computing device is displayed in conjunction with the media stream.

29. The method of claim 23, further comprising the step of determining, in the client computing device, the first input command according to user input obtained from an input device.

30. The method of claim 23, further comprising the steps of:

obtaining, in the client computing device, force feedback relating to the game from the game server; and providing the force feedback to at least one haptic device in the client computing device.

* * * * *